Jan. 9, 1934.    J. C. WELLS    1,942,851
OPHTHALMIC MOUNTING
Original Filed April 27, 1927
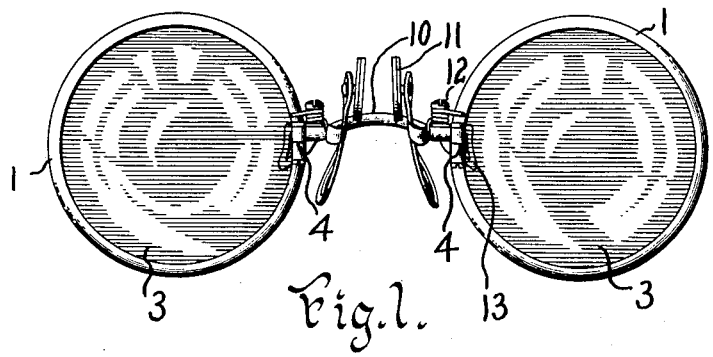
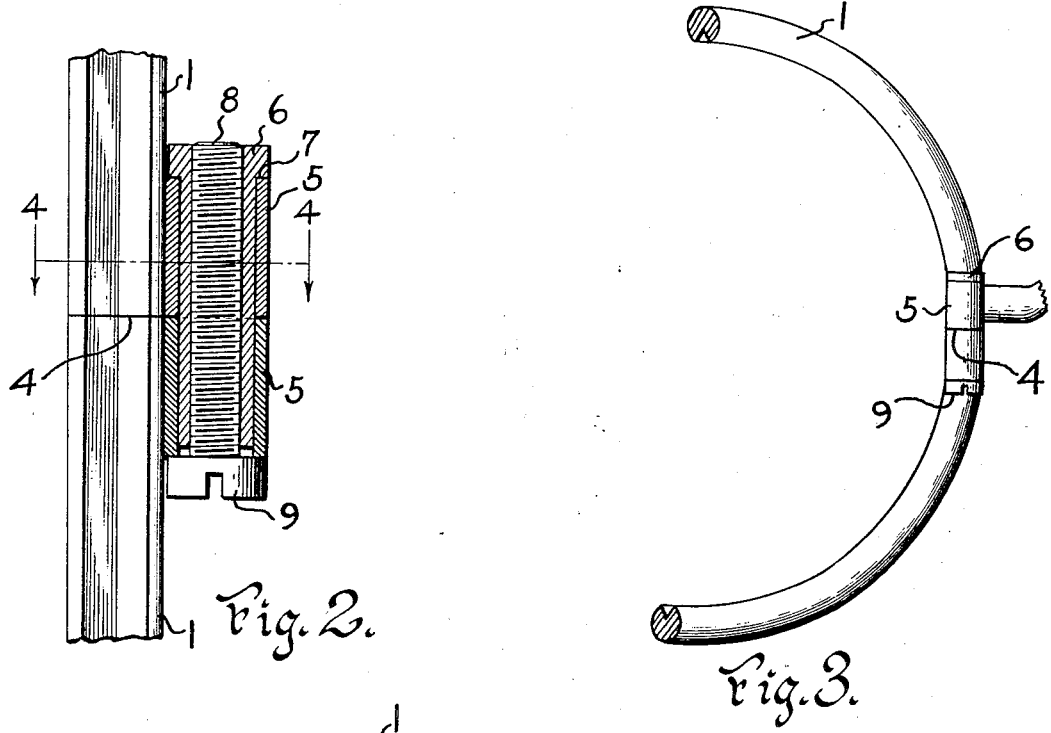
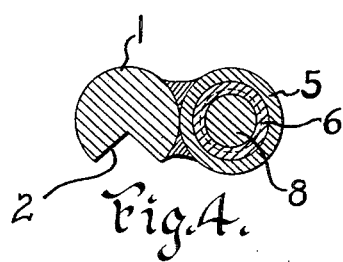
Inventor
Joel C. Wells.
By Harry H. Styll.
Attorney Patented Jan. 9, 1934

1,942,851

UNITED STATES PATENT OFFICE 1,942,851

OPHTHALMIC MOUNTING

Joel C. Wells, Southbridge, Mass.

Application April 27, 1927, Serial No. 186,897
Renewed June 29, 1933

6 Claims. (Cl. 88—47)

This invention relates to improvements in ophthalmic mountings and has particular reference to means for connecting the split or divided ends of lens holding rims of such mountings.

The principal object of the invention is to provide a rim connection that is inconspicuous yet will have sufficient connection area to provide increased durability and longevity to connections of this kind.

Another object of the invention is to provide increased thread area in rim connections of this character.

Another object of the invention is to provide a rim connection invisible from the front when the mounting is in place on the face but which has increased connection area over that usual in connections of this character.

Another object of the invention is to provide simple, inexpensive and efficient rim connecting means that will be invisible in the ordinary positions of use of the ophthalmic mounting.

Other objects and advantages of the invention will become apparent from the following description taken in connection with the accompanying drawing and it will be apparent that minor changes may be made in the details of construction and arrangement of parts without departing from the spirit of the invention, as expressed in the accompanying claims; I, therefore, do not wish to be limited to the exact details of construction and arrangements shown, the preferred forms only having been shown by way of illustration.

Referring to the drawing:

Fig. 1 is a rear view of an ophthalmic mounting embodying the invention.

Fig. 2 is a partial elevation in cross section through the rim connection.

Fig. 3 is an enlarged rear view of the rim showing the rim slightly deformed from position at the point of attachment of the bridge.

Fig. 4 is a cross section on line 4—4 of Fig. 2.

In order to insert the lenses in the lens rims of ophthalmic frames it has been usual to divide the frame at some one point in its periphery and to provide connecting means which will allow the rim to be drawn up tightly on the lens when the lens has been inserted in place therein. Great difficulty has been encountered in providing such rim connections of sufficient size to provide a secure and long wearing fitting. Where the rim connection was made of sufficient size for durability it became very conspicuous and objectionable to the wearer for that reason. On the other hand, if the fitting were made small the screw connection soon wore out and allowed the joint connection to become loose and the lenses to slip in the rims or be displaced entirely therefrom.

It is, therefore, the object of this invention to provide a rim connection that is both inconspicuous and of sufficient contact area to insure long life and durability.

Referring to the drawing wherein similar characters of reference denote similar parts throughout, the lens rims 1 are provided with a lens groove 2 to hold the lenses 3 in place therein. The lens rims 1 are transversely divided on the line 4. On the rear or eye side of the rims 1 adjacent the dividing line 4 are secured the lugs 5, one on each side of the line 4, and abutting on a continuation of the line 4 so that the joint of the rim sections 1 and the lugs 5 will be on a continuous line through the rim and through the lugs 5. The lugs 5 are soldered or otherwise secured to the rims 1. The lugs 5 have a circular longitudinal bore or hole therethrough into which is fitted a sleeve 6 which is circular in cross section and also has a longitudinal circular opening or bore and has the offset head 7 fitting over the lug 5. The sleeve 6 is inserted from the top in the bore of the lugs 5 until the offset head 7 rests on one end of the lug 5. The internal bore or opening of the sleeve 6 is screw threaded to receive the screw 8 having the screw head 9. The screw 8 is inserted in the bore of the sleeve 6 from the opposite end to that in which the sleeve 6 is inserted in the bore of the lugs 5. The screw thread engagement of the screw 8 with the screw threads in the bore of the sleeve 6 throughout the length of the sleeve 6 insures a long screw thread contact, one giving great strength and durability.

It will be apparent that with the long screw thread contact of the screw 8 in the sleeve 6 the external diameter of the lugs 5 may be made very small, in fact so small that the lugs 5 will be hidden behind and covered by the rims 1 so that they will not be visible from the front of the rim when the rim is in place on the face of the wearer. The rims 1 are connected in proper alignment by the bridge 10 and the nose guards 11 are pivoted on the bridge by the pivots 12 and are operated by the fingerpieces or handles 13.

The operation is as follows: When it is desired to place a lens 3 in the rim 1 the screw 8 is loosened by means of the screw head 9 so that the rim 1 may be separated on the line 4. The lens 3 is then placed in the groove 2 of the rim 1 and the screw 8 again tightened up by means of the screw head 9 until the rim ends abut tightly together on the line 4. This holds the lens tightly in place. The connection of the long sleeve 6 in the divided lugs 5 insures a long bearing thread contact of small diameter whereby long life and durability of the connection is obtained.

From the foregoing it will be seen that I have provided simple and efficient means for carrying out the objects of the invention.

Having described my invention, I claim:

1. In a device of the character described, a divided lens rim, a relatively long and relatively thin tube having a longitudinal side secured to the rim and divided on the line of division thereof, a second tube within the first and having a shoulder extending over one end of the first tube, said second tube extending substantially the full length of the first tube, the internal portion of the second tube being threaded and screw means extending into the threaded portion of the second tube and having a head portion extending over the opposite end of the first tube from that of the shoulder of the second tube, said screw extending entirely through the second tube.

2. In a device of the character described, a divided lens rim, said division being transverse to the plane of the rim, a tubular lug on the eye side of the rim on each side of the division thereof, said tubular lugs being of substantially the same size as the rim in cross section and extending longitudinally along the rim with their axes parallel thereto, a threaded tubular sleeve in the tubular lug on one side of the division line of the rim and extending into the other tubular lug on the other side of said division, said sleeve having an enlarged head portion of substantially the same diameter as the tubular lugs and overlying the end of one of said lugs, a screw threaded member extending through the threaded bore of the sleeve to draw the two lugs and the two ends of the lens rim together, said tubular sleeve and lugs having side walls of substantially the same thickness.

3. In a device of the character described, a divided lens rim, said line of division being transverse to the plane of the rim, a tubular lug on the eye side of the rim on each side of the division thereof, said lugs being of substantially the same size in cross section as the rim and extending longitudinally along the rim with their axes parallel thereto, a tubular sleeve extending into the tubular lugs on each side of the division of the rim, said sleeve having a head portion of substantially the same diameter as the tubular lugs and overlying one end of one of the lugs and means to draw the two ends of the rim together, said tubular sleeve and lugs having side walls of substantially the same thickness.

4. In a device of the character described, a divided lens rim, said line of division being transverse to the plane of the rim, tubular lugs of substantially the same size in cross section as the rim located one on each side of the division of the rim and on the eye side of the rim and hidden by the rim when viewed from the front and extending longitudinally along the rim with their axes substantially parallel thereto, a tubular sleeve having a threaded bore secured to one of said lugs and having a portion extending into the other lug to hold the lugs in axial alignment, said sleeve having a head portion of substantially the same diameter as the lugs and overlying the end of one of the lugs, and a screw member threaded into the threaded bore of the tubular sleeve to draw the lugs and the ends of the rim together, said screw member having a head portion of substantially the same diameter as the lugs and overlying the end of one of the lugs and said tubular sleeve and lugs having side walls of substantially the same thickness.

5. In a device of the character described, a divided lens rim, a tubular lug on the eye side of the rim on each side of the division thereof and of such a size as to be substantially invisible when the mounting is viewed from the front, and extending longitudinally along the rim with their axes substantially parallel thereto and having relatively thin parallel side walls, a tubular sleeve in the tubular lugs adapted to hold the said lugs in aligned relation with each other, said sleeve having relatively thin side walls extending substantially parallel with the side walls of the tubular lugs and being of substantially equal thickness and means for securing said lugs in aligned relation with each other on the sleeve to hold the divided ends of the lens rim together.

6. In a device of the character described, a divided lens rim, a tubular lug on the eye side of the rim on each side of the division thereof and of such a size as to be substantially invisible when the mounting is viewed from the front and extending longitudinally along the rim with their axes substantially parallel thereto and having relatively thin parallel side walls, a tubular sleeve in the tubular lugs, said sleeve having a threaded bore and having relatively thin side walls extending substantially parallel with the side walls of the tubular lugs and being of substantially equal thickness, means cooperating with one of said tubular lugs and the portion of the tubular sleeve extending through said lug for fixing the sleeve against withdrawal through said lug toward the other lug and a screw threaded member extending into the threaded bore of the sleeve to draw the two tubular lugs toward each other on the tubular sleeve and to secure the divided ends of the lens rim together.

JOEL C. WELLS.